United States Patent [19]

Terasawa

[11] Patent Number: 4,682,184

[45] Date of Patent: Jul. 21, 1987

[54] SUCTION RECOVERING DEVICE FOR AN INK JET PRINTER AND INK JET PRINTER HAVING THE SAME DEVICE

[75] Inventor: Koji Terasawa, Mitaka, Japan

[73] Assignee: Canon Kabushiki Kaisha, Tokyo, Japan

[21] Appl. No.: 903,843

[22] Filed: Sep. 4, 1986

Related U.S. Application Data

[63] Continuation of Ser. No. 798,396, Nov. 15, 1985, abandoned.

[30] Foreign Application Priority Data

Nov. 19, 1984 [JP] Japan ................................ 59-244054

[51] Int. Cl.$^4$ ................................ G01D 15/16

[52] U.S. Cl. ................................ 346/140 R

[58] Field of Search ................................ 346/140

[56] References Cited

U.S. PATENT DOCUMENTS

| | | | |
|---|---|---|---|
| 3,551,735 | 11/1975 | Suzuki et al. | 346/140 |
| 4,369,454 | 1/1983 | Kyogoku | 346/140 |
| 4,383,263 | 3/1983 | Ozawa et al. | 346/140 |
| 4,403,233 | 9/1983 | Terasawa et al. | 346/140 |
| 4,410,900 | 10/1983 | Terasawa | 346/140 |
| 4,432,004 | 2/1984 | Glattli | 346/140 |
| 4,437,105 | 3/1984 | Mrazer | 346/140 |
| 4,506,277 | 3/1985 | Terasawa | 346/140 |
| 4,510,510 | 4/1985 | Terasawa | 346/140 |
| 4,518,973 | 5/1985 | Tazaki | 346/140 |
| 4,543,589 | 9/1985 | Terasawa | 346/140 |
| 4,543,591 | 9/1985 | Terasawa | 346/140 |
| 4,556,894 | 12/1985 | Terasawa | 346/140 |
| 4,558,332 | 12/1985 | Takahaski | 346/140 |
| 4,590,495 | 5/1986 | Okamura | 346/140 |

*Primary Examiner*—Joseph W. Hartary

*Attorney, Agent, or Firm*—Fitzpatrick, Cella, Harper & Scinto

[57] ABSTRACT

A suction recovering device for an ink jet printer is provided with liquid injection recording means for injecting ink to the recording surface of a recording medium to thereby effect recording and a cap member opposed to the liquid injection recording means in a predetermined position, characterized in that a porous cellular structure in which capillary forces are created is provided below the cap member, the porous cellular structure being designed so as to be capable of contacting a porous absorbing member in a waste ink reservoir.

12 Claims, 3 Drawing Figures

SUCTION RECOVERING DEVICE FOR AN INK JET PRINTER AND INK JET PRINTER HAVING THE SAME DEVICE

This application is a continuation of application Ser. No. 798,396 filed Nov. 15, 1985, now abandoned.

BACKGROUND OF THE INVENTION

1. Field of the Invention

This invention relates to a suction recovering device for an ink jet printer, and in particular to a suction recovering device for sucking ink from a nozzle portion for effecting jetting of ink therethrough and thereby eliminating bubbles or clogging and to an ink jet printer having such suction recovering device.

2. Description of the Prior Art

According to the prior art, an ink jet printer may be provided with a carriage movable in a predetermined direction along the recording surface and have one or more liquid jet recording units mounted on the carriage to thereby effect recording. In the ink jet printer of this type, when bubbles mix with the liquid jet recording unit or units or when clogging occurs in the nozzle portion thereof, the carriage is brought to a predetermined position not opposed to the recording surface, for example, a home position, and ink is sucked from the nozzle portion by a suction recovering device disposed at that position, thereby eliminating the bubbles or the clogging.

In such an ink jet printer, preparatory discharge is effected to accomplish printing on recording paper in a stable state when the main switch is in its closed position or when the printing operation is again started after the printing operation has been stopped for a predetermined time, but in the structure according to the prior art, ink drips onto the lower surface of the cap member of the suction recovering device during this preparatory discharge with the result that the printer is contaminated.

SUMMARY OF THE INVENTION

The present invention has been made in view of the above-noted disadvantage and an object thereof is to provide a suction recovering device for an ink jet printer which can reliably avoid contamination of the printer even if dripping of ink occur during preparatory discharge or the like and an ink jet printer having such suction recovering device.

Another object of the present invention is to provide a suction recovering device for an ink jet printer which is provided with liquid jet recording means for jetting ink to the recording surface of a recording medium to thereby effect recording and a cap member opposed to said liquid jet recording means in a predetermined position and wherein a porous cellular structure in which capillary forces are created is provided below said cap member, said porous cellular structure being designed so as to be capable of contacting a porous absorbing member in a waste ink reservoir.

Still another object of the present invention is to provide an ink jet printer which has liquid jet recording means for jetting ink to the recording surface of a recording medium to thereby effect recording and a suction recovering device provided with a cap member opposed to said recording means in a predetermined position and wherein a porous cellular structure in which capillary forces are created is provided below said cap member, said porous cellular structure being designed so as to be capable of contacting a porous absorbing member in a waste ink reservoir.

DESCRIPTION OF THE PREFERRED EMBODIMENT

The present invention will hereinafter be described in detail with reference to the drawings.

Figure 1:
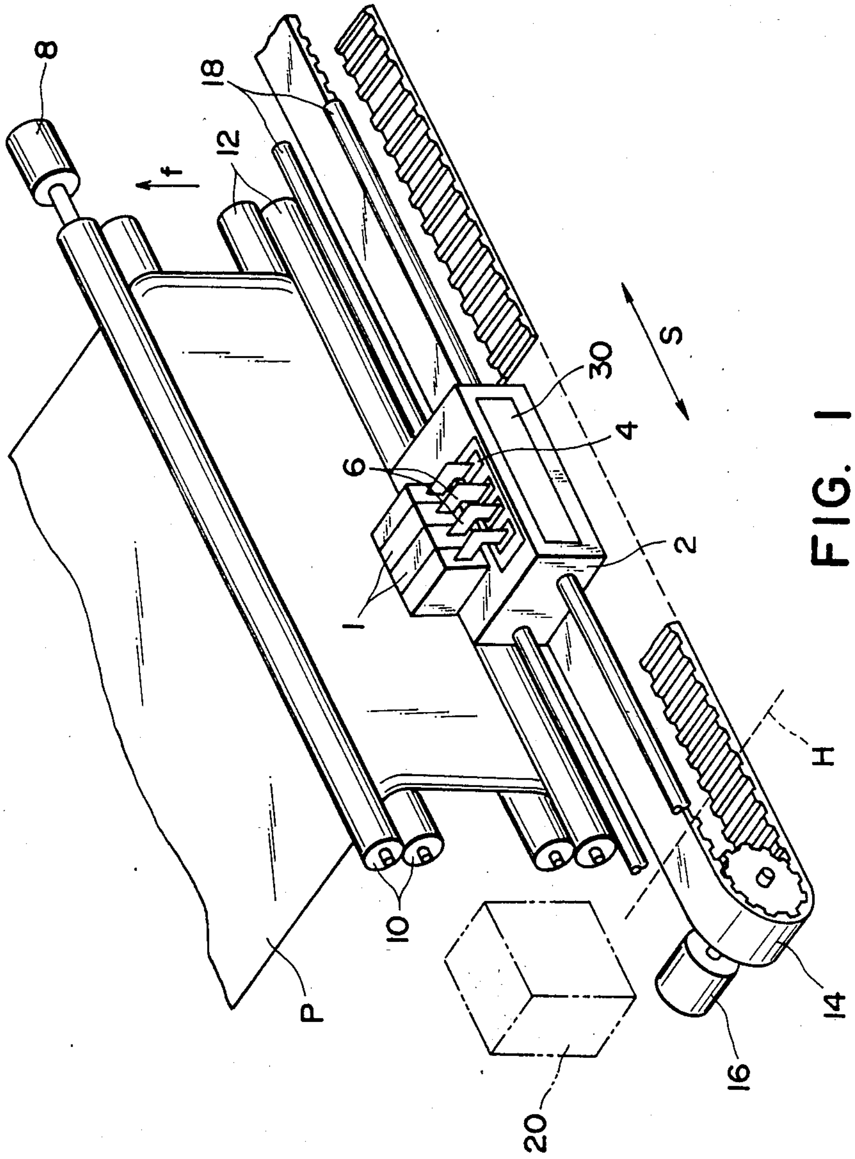
FIG. 1 is a perspective view showing an example of the construction of an ink jet printer.

FIG. 1 shows an example of the construction of the essential portions of an ink jet printer to which the present invention is applicable. In FIG. 1, reference numeral 1 designates liquid injection recording units mounted on a carriage 2. The liquid injection recording units 1 each have a reservoir portion for storing therein ink supplied from an ink supply source, and a recording head provided with a nozzle portion for injecting the stored ink therethrough. For example, four such units 1 are provided correspondingly to the colors of ink. A cartridge tank as the ink supply source is mountable on the carriage 2, as will later be described. Reference numeral 4 designates printed wiring plates for controlling the ink discharge by the liquid jet recording units 1, and reference numeral 6 denotes flexible cables for connecting the printed wiring plates 4 to the liquid jet recording units 1. The printed wiring plates 4 and the flexible cables 6 are connected together through connectors 5. Reference numeral 8 designates a paper feeding motor. When this paper feeding motor 8 is driven, recording paper P may be conveyed in the direction of arrow F by rollers 10 and 10. Reference numeral 12 denotes rollers which cooperate with the rollers 10 to make the recording paper P flat and form the recording surface relative to the liquid jet recording units 1.

Reference numeral 14 designates a carriage driving belt to which the carriage 2 is fixed, reference numeral 16 denotes a motor for driving the belt 14 in the directions of bilateral arrow S, and reference numeral 18 designates guide rails for the carriage 2. When the motor 16 is driven, the carriage 2 may be moved in the directions of bilateral arrow S along the guide rails 18 to thereby accomplish recording on the recording surface.

Reference numeral 20 designates a suction recovering device opposed to the liquid jet recording units 1 in their home position H and for sucking the ink.

Figure 2:
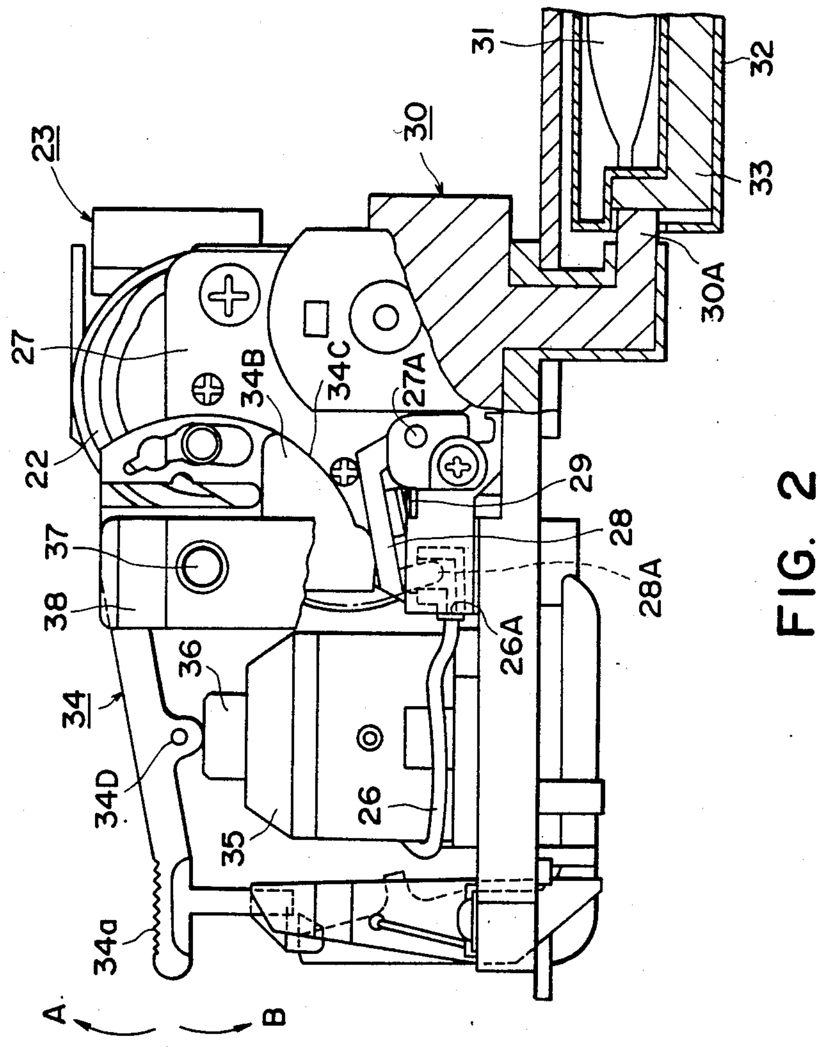
FIGS. 2 and 3 are a front view and a side view, respectively, showing an example of the construction of a suction recovering device in the ink jet printer of FIG. 1.
Figure 3:
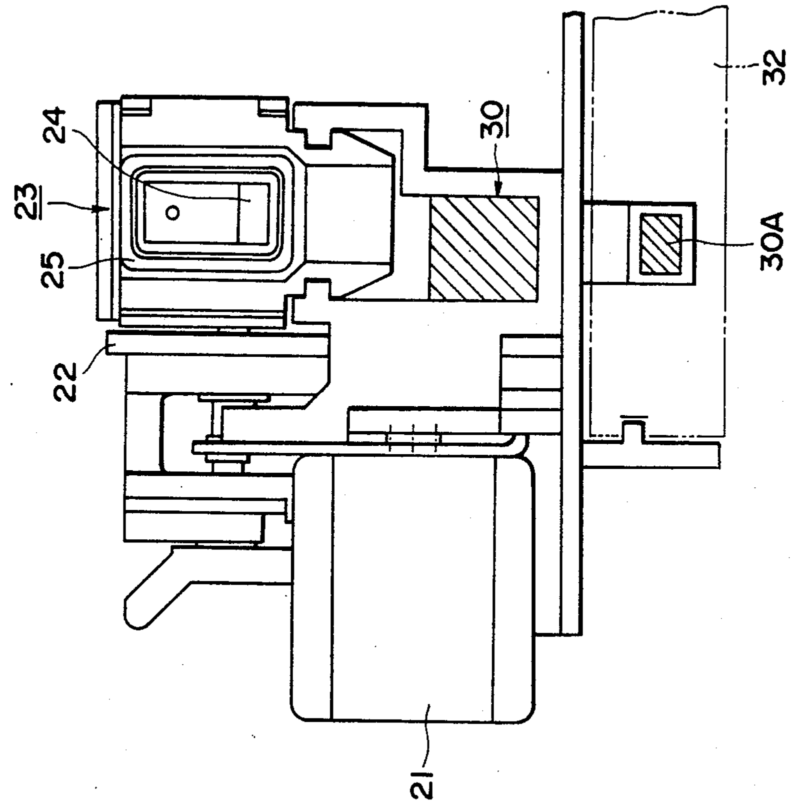

FIGS. 2 and 3 show an example of the construction of such suction recovering device. In FIGS. 2 and 3, reference numeral 21 denotes a motor as the drive source of the suction recovering device, and revolutions of this motor 21 are transmitted to a cam gear 22.

Reference numeral 23 designates a cap member opposed to the liquid jet recording units 1 when the carriage 2 is in its home position H. The cap member 23 has an absorbing member 24 joined to the nozzle portion and formed, for example, of a water-absorbing porous material, and a rubber member 25 for forming an airtight seal with the nozzle portion in the joined state. One end of a pipe 26 for permitting the pressurized air in the cap member 23 to escape to the outside atmosphere when the nozzle portion is closed up by the cap member 23 is connected to the cap member 23, and the distal end of this atmosphere opening pipe is open to the atmosphere. In the present embodiment, the distal end opening 26A of the atmosphere opening pipe 26 is designed to be opened and closed by the protruding portion 28A of a vent valve 28 pivotably supported by a support shaft 27A fixed to a support bracket 27. The vent valve 28 is normally biased upwardly as viewed in FIG. 2 by a spring 29 and accordingly, the distal end opening 26A of the atmosphere opening pipe 26 is open to the atmosphere when there is no extraneous force applied to the vent valve 28.

A porous cellular structure (formed, for example, of polyvinyl alcohol) 30 in which capillary forces are created is disposed below the cap member 23, and the lower portion 30A of this porous cellular structure 30 is designed so as to be capable of contacting a porous absorbing member 33 provided in a waste ink reservoir within an ink cartridge 32 containing an ink bag 31 therein. (Of course, the porous absorbing member 33 may be provided in a waste ink reservoir provided separately from the ink cartridge 32.) Accordingly, with such a construction, all the drips of ink from within the cap member 23 caused by preparatory discharge or the like are received by the porous cellular structure 30 and further, this ink can be collected into the ink cartridge 32 through the porous absorbing member 33 which is in contact (see FIG. 2) with the porous cellular structure 30. Consequently, the contamination of the printer by these drips of ink can be reliably prevented.

Reference numeral 34 designates an operating lever for effecting a pump suction operation by reciprocally moving the piston 36 of a pump 35. The operating lever 34 is pivotally supported on a support member 38 by a pin 37 and is pivotable about the pin 37. By pushing the operating portion 34A of this operating lever 34 upwardly in the direction of arrow A from the position of FIG. 2, the small-diameter portion 34C of a cam surface portion 34B comes into correspondence with to the vent valve 28 and therefore, the vent valve 28 is biased upwardly by the spring force of the spring 29 and the distal end opening 26A of the atmosphere opening pipe 26 becomes open to the atmosphere. On the other hand, when the operating portion 34A is pushed down in the direction of arrow B, the distal end opening 26A of the atmosphere opening pipe 26 is closed as shown in FIG. 2, but in this case, the piston 36 is pressed by the protrusion 34D of the operating portion 34A and thus, a pump suction operation is effected. A spring (not shown) for pushing up the piston 36 is contained in the pump 35, and the pump 35 and the cap member 23 are connected together through a suction pipe (not shown). That is, when the pump 35 is driven, ink is sucked from the nozzle portion through the absorbing member 24 and is further directed into the pump 35 through the suction pipe.

The ink cartridge and the waste ink reservoir, as previously mentioned, need not always be disposed in the carriage, but may of course be of the type which is immovably installed in the apparatus body.

According to the present invention, as described above, the porous cellular structure in which capillary forces are created is provided below the cap member, and this porous cellular structure is capable of contacting the porous absorbing member in the ink cartridge containing, for example, an ink bag therein and therefore, the drips of ink caused by preparatory discharge or the like can be received by the porous cellular structure and collected into the ink cartridge through the porous absorbing member, whereby contamination of the printer by ink can be reliably prevented.

I claim:

1. A suction recovering device for an ink jet printer provided with liquid injection recording means for injecting ink to the recording surface of a recording medium to thereby effect recording and a cap member opposed to said liquid injection recording means in a predetermined position, characterized in that a porous cellular structure in which capillary forces are created is provided below said cap member, said porous cellular structure being designed so as to be capable of contacting a porous absorbing member in a waste ink reservoir.

2. A suction recovering device according to claim 1, wherein said waste ink reservoir is provided in an ink cartridge.

3. A suction recovering device according to claim 1, wherein said contact is always effected.

4. A suction recovering device according to claim 1, wherein a pump for sucking ink from said liquid injection recording means through said cap member is provided.

5. A suction recovering device according to claim 4, wherein waste ink discharged from said pump is discharged into said waste ink reservoir.

6. An ink jet printer having liquid injection recording means for injecting ink to the recording surface of a recording medium to thereby effect recording and a suction recovering device provided with a cap member opposed to said recording means in a predetermined position, characterized in that a porous cellular structure in which capillary forces are created is provided below said cap member, said porous cellular structure being designed so as to be capable of contacting a porous absorbing member in a waste ink reservoir.

7. An ink jet printer according to claim 6, wherein said waste ink reservoir is provided in an ink cartridge for storing ink therein.

8. An ink jet printer according to claim 6, wherein said contact is always effected.

9. An ink jet printer according to claim 6, wherein a pump for sucking ink from said liquid injection recording means through said cap member is provided.

10. An ink jet printer according to claim 9, wherein waste ink discharged from said pump is discharged into said waste ink reservoir.

11. An ink jet printer according to claim 6, wherein said liquid injection recording means is disposed on a carriage.

12. An ink jet printer according to claim 11, wherein said waste ink reservoir is disposed in said carriage.

* * * * *

UNITED STATES PATENT AND TRADEMARK OFFICE
CERTIFICATE OF CORRECTION

PATENT NO. : 4,682,184

DATED : July 21, 1987

INVENTOR(S) : KOJI TERASAWA

It is certified that error appears in the above-identified patent and that said Letters Patent is hereby corrected as shown below:

On the title page

AT [56] UNDER REFERENCES CITED/U.S. PATENT DOCUMENTS

Line 1, "3,551,735 11/1975 Suzuki et al. ....346/140" should read --4,551,735 11/1985 Suzuki et al. ....346/140--.

Line 7, "Mrazer" should read --Mrazek--.

COLUMN 1

Line 37, "drips" should read --can drip--.

Line 46, "occur" should read --occurs--.

COLUMN 2

Line 37, "10 and" should be deleted.

Line 51, "H and for" should read --H for effecting the--.

Line 64, "26 for" should read --26, for--.

Line 67, "23 is" should read --23, is--.

Line 68, "atmosphere opening" should be deleted.

UNITED STATES PATENT AND TRADEMARK OFFICE
CERTIFICATE OF CORRECTION

PATENT NO. : 4,682,184

DATED : July 21, 1987

INVENTOR(S) : KOJI TERASAWA

It is certified that error appears in the above-identified patent and that said Letters Patent is hereby corrected as shown below:

COLUMN 3

Line 2, "atmosphere opening" should be deleted.
Line 8, "atmosphere opening" should be deleted.
Line 37, "to" should be deleted.
Line 40, "atmosphere opening" should be deleted.
Line 44, "atmosphere opening" should be deleted.

Signed and Sealed this

Eighth Day of December, 1987

*Attest:*

DONALD J. QUIGG

*Attesting Officer*

*Commissioner of Patents and Trademarks*